United States Patent
Sardesai et al.

(10) Patent No.: US 11,032,064 B2
(45) Date of Patent: Jun. 8, 2021

(54) BLOCKCHAIN LEDGER GROWTH MANAGEMENT

(71) Applicant: VERIZON MEDIA INC., New York, NY (US)

(72) Inventors: Ashish Sardesai, Ashburn, VA (US); Dante J. Pacella, Charles Town, WV (US); Lachlan Maxwell, Ashburn, VA (US); Venkata Josyula, Ashburn, VA (US); Mani Tadayon, Leesburg, VA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/225,016

(22) Filed: Dec. 19, 2018

(65) Prior Publication Data

US 2020/0204344 A1 Jun. 25, 2020

(51) Int. Cl.
*H04L 29/06* (2006.01)
*H04L 9/06* (2006.01)
*H04L 29/08* (2006.01)

(52) U.S. Cl.
CPC ........ *H04L 9/0637* (2013.01); *H04L 67/1042* (2013.01); *H04L 67/125* (2013.01); *H04L 67/327* (2013.01)

(58) Field of Classification Search
CPC . H04L 9/0637; H04L 67/1042; H04L 67/327; H04L 67/125
See application file for complete search history.

(56) References Cited

U.S. PATENT DOCUMENTS

| | | | | |
|---|---|---|---|---|
| 10,476,847 | B1 * | 11/2019 | Smith | H04L 63/0407 |
| 2017/0046806 | A1 * | 2/2017 | Haldenby | G06F 21/645 |
| 2018/0150835 | A1 * | 5/2018 | Hunt | H04L 67/10 |
| 2018/0152289 | A1 * | 5/2018 | Hunt | G06Q 20/223 |
| 2018/0181768 | A1 * | 6/2018 | Leporini | H04L 9/0637 |
| 2018/0285839 | A1 * | 10/2018 | Yang | G06Q 20/0655 |
| 2019/0036887 | A1 * | 1/2019 | Miller | G06F 16/27 |
| 2019/0043043 | A1 * | 2/2019 | Saraniecki | G06Q 20/3678 |
| 2019/0058581 | A1 * | 2/2019 | Wood | H04L 9/3239 |
| 2019/0140935 | A1 * | 5/2019 | Kikinis | H04L 9/3239 |
| 2019/0236594 | A1 * | 8/2019 | Ehrlich-Quinn | G06Q 20/065 |
| 2019/0251199 | A1 * | 8/2019 | Klianev | G06F 16/2365 |
| 2019/0312855 | A1 * | 10/2019 | Sharma | H04L 67/18 |
| 2019/0379754 | A1 * | 12/2019 | Krishnaswamy | H04L 67/28 |
| 2020/0019288 | A1 * | 1/2020 | D'Amore | G06Q 10/101 |
| 2020/0050386 | A1 * | 2/2020 | Natarajan | G06F 3/067 |
| 2020/0050791 | A1 * | 2/2020 | Miller | G07C 9/20 |
| 2020/0142965 | A1 * | 5/2020 | Weldemariam | G06F 16/214 |
| 2020/0195441 | A1 * | 6/2020 | Suen | H04L 9/3236 |

OTHER PUBLICATIONS https://blockgeeks.com/guides/smart-contracts/.
https://blockchainhub.net/smart-contracts/.

* cited by examiner

*Primary Examiner* — Mahfuzur Rahman
(74) *Attorney, Agent, or Firm* — James J. DeCarlo; Greenberg Traurig, LLP (57) ABSTRACT

Systems and methods for blockchain ledger growth management using separation of a blockchain ledger into multiple blockchain ledgers (each ledger having a state that can be tracked and used). The systems and methods also include linking the separated ledgers by utilizing a linking application and smart contracts added to the separated ledgers.

20 Claims, 6 Drawing Sheets

BLOCKCHAIN LEDGER GROWTH MANAGEMENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to blockchain ledger growth management.

BACKGROUND

A blockchain is a digitized, decentralized, public ledger of digital transactions. Blockchain technology allows applications and users of the applications to keep track of digital transactions without central recordkeeping. Each blockchain node (such as a computer system connected to a network supporting blockchain technology) can receive and use a copy of the blockchain. Blockchain ledgers can constantly grow, and blocks of a blockchain are often recorded and added to the ledger in chronological order in the network.

In cases where the data associated with transactions in a blockchain is ephemeral or useable for only a short period of time, the constant growth of a blockchain ledger becomes a concern as the expired data or non-useable data provides little to no value to the application using the ledgers or the users using the application. However, the expired data or non-useable data can become a burden on resources of the network supporting the blockchain. And, at the rate in which blockchain ledgers can grow, the magnitude of the expired data or non-useable data can become dysfunctional and/or significantly degrade the performance of the application relying on the blockchain ledger. Also, as the growth of ledger is in a chronological fashion, the ratio of valid data on the ledger to the expired or no longer useful data is skewed towards the latter.

Another consideration is that as a blockchain grows its integrity may increase; thus, shortening a fast growing blockchain or breaking it up into smaller parts can introduce technical problems associated with blockchain integrity. For example, the ability of blockchains to maintain immutability and integrity of transactions can occur by aggregating multiple transactions within a block of the chain along with hashes of the previous blocks; thus, creating a dependency chain. The dependency chain can be corrupted or its use eliminated completely, if the blockchain is shortened or separated into smaller parts.

Thus, solutions for managing the growth of blockchain ledgers are complex, especially solutions for managing the growth of blockchain ledgers that have ephemeral data or data useable for only a short period of time.

SUMMARY

Described herein are improved systems and methods for blockchain ledger growth management that can overcome at least the technical problems mentioned in the background section.

In general, embodiments disclosed herein can overcome such technical problems using a combined technical solution of: (1) separating a blockchain ledger into multiple blockchain ledgers (each ledger having a state that can be tracked and used), and (2) linking the separated ledgers by using a linking application and smart contracts added to the separated ledgers. The technical solution can provide an efficient and effective way of dividing up, deactivating and/or archiving expired data or non-useable data that is often associated with overwhelming a blockchain ledger and the application that relies on the ledger. When the expired data or non-useable data is deactivated and/or archived by the methods and systems, it becomes blocked from use by the application relying on the blockchain ledger; and thus, the application's performance is not degraded by the growth of the blockchain ledger, especially by the growth of ledgers with expired data or non-useable data.

However, the separating of the blockchain ledgers can introduce technical problems associated with blockchain transaction integrity (e.g., the ability of blockchains to maintain immutability and integrity of transactions by aggregating multiple transactions within a block along with hashes of the previous blocks thus creating a dependency chain). In order to address the blockchain integrity concern with breaking up the blockchain into parts, the technical solutions set forth herein include creating a linkage between the separated blockchain parts.

In summary, examples of the systems and methods disclosed herein provide specific technical solutions to at least the technical problems mentioned in the background section and other parts of the application as well as other technical problems not described herein but recognized by those of skill in the art.

Additionally, some of the methods and systems described herein rely on blockchain ledgers being able to invoke one or more smart contracts. Also, some of the technical solutions rely on the applications transactions being divided into two types. Transaction executions on the ledgers can be divided into at least two types of processes, a read process and a read and write process (read/write process). A read process can include a request for data previously stored on a ledger. A read/write process can include submitting data to be stored and/or processed on a ledger. Applications can execute one or more of the aforementioned transaction types on a ledger in performance of the application or upon requests of the users of the application or the one or more servers managing the ledgers. The transactions can be included in blocks of the blockchains implementing the ledgers, and the read/write transactions can be recorded on a ledger; thus, leading to significant growth of ledgers.

Furthermore, as the growth of ledger can be in a chronological fashion or a size fashion in some embodiments, the solutions to manage and control ledger storage growth can focus on at least four example general technical solutions. The first example solution of the four general solutions includes a fixed-time-duration- or size-based ledger for recording the read/write transactions. The second example solution of the four solutions includes the server(s) or the application looking-up or retrieving transactions from multiple ledgers, such as performing the read transactions on multiple ledgers. Such operations can occur on a ledger considered "current" or "previous" by the application or the server(s). The third example solution includes creating a linkage across each of the previous ledgers in a chronological fashion such that transactional integrity is maintained across ledgers. The fourth example solution includes deactivating and archiving functions to close down and optionally archive ledgers that are deemed to contain transactions no longer used by or useful for the application.

At least the aforesaid four example technical solutions (which are further disclosed herein), provide specific technical solutions to at least the technical problems mentioned in the background section and other parts of the application as well as other technical problems not described herein but recognized by those of skill in the art.

In accordance with one or more embodiments, this disclosure provides computerized methods for blockchain ledger growth management, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., application server, transactions server, client device, and the like) cause at least one processor to perform a method for a novel and improved blockchain ledger growth management.

In accordance with one or more embodiments, a system is provided that includes one or more computing devices configured to provide functionality in accordance with one or more embodiments of a novel and improved blockchain ledger growth management.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

In general, embodiments disclosed herein are systems and methods using a combined solution of: (1) separating a blockchain ledger into multiple blockchain ledgers (each ledger having a state that can be tracked and used), and (2) linking the separated ledgers by using a linking application and smart contracts added to the separated ledgers. The general solution can provide an efficient and effective way of deactivating and/or archiving expired data or non-useable data that is often associated with overwhelming a blockchain ledger and the application that relies on the ledger. When the expired data or non-useable data is deactivated and/or archived by the methods and systems, it becomes blocked from use by the application relying on the blockchain ledger; and thus, the application's performance is not degraded by the growth of the blockchain ledger, especially by the growth of ledgers with expired data or non-useable data.

Figure 1:
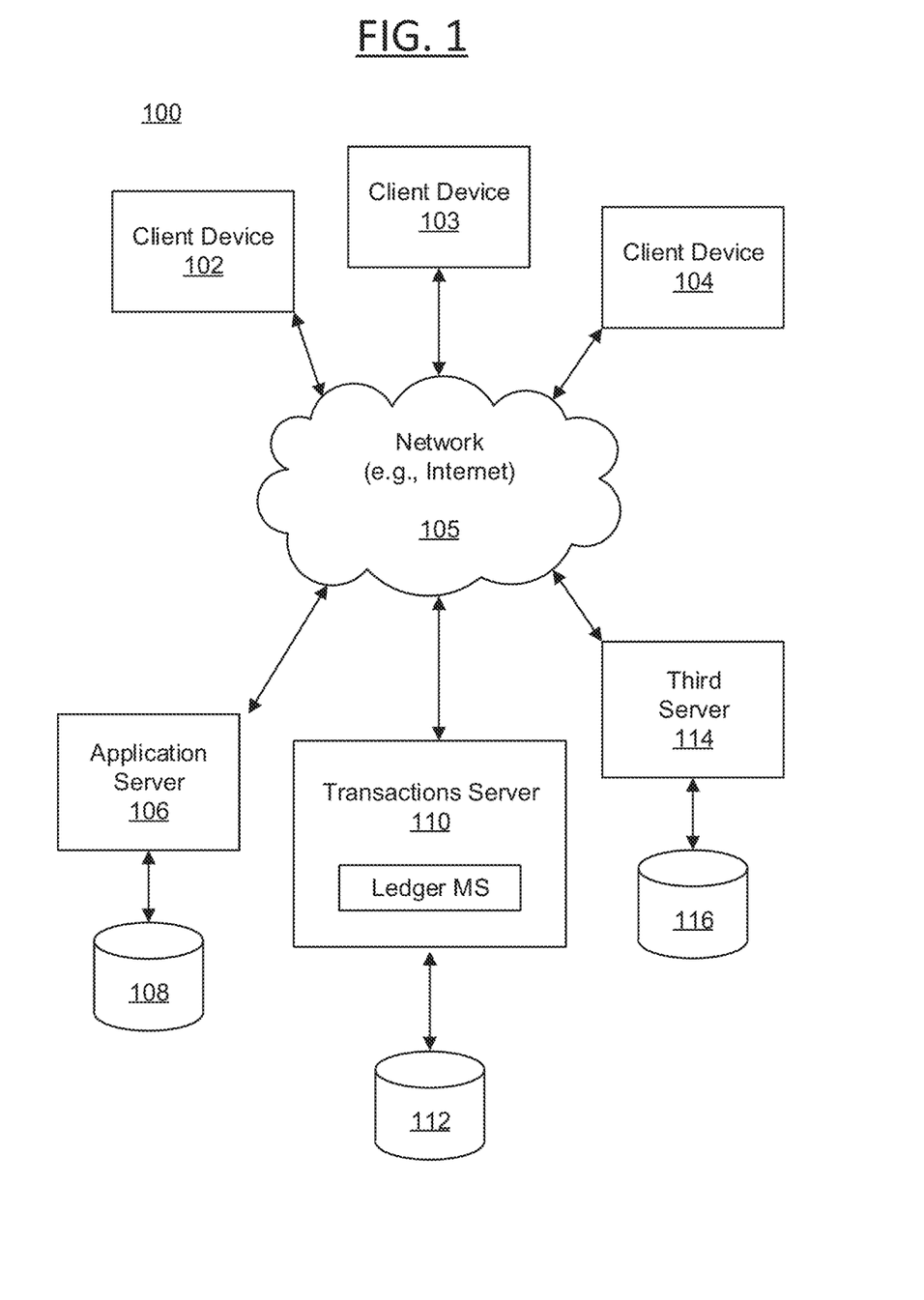
FIG. 1 is a schematic diagram illustrating an example of a network (which includes elements that can implement blockchain ledger growth management) within which systems and methods disclosed herein can be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")—network 105, client devices 102-104 (e.g., such as handheld or mobile devices, Internet of Things devices, etc.), application server 106 communicatively coupled to database 108 used by the application server, transactions server 110 including a blockchain ledger management system (ledger MS) and communicatively coupled to database 112 used by the transactions server, and third server 114 communicatively coupled to database 116 use by the third server. Each of the servers 106, 110, and 114 can include a device that includes a configuration to perform at least some of the operations of process 300 depicted in FIG. 3 and operations 400 and 500 illustrated in FIGS. 4 and 5 respectively. Embodiments of client devices 102-104 and servers 106, 110, and 114 are described in more detail below.

Generally, client devices 102-104 can include virtually any computing device capable of receiving and sending a message over a network, such as network 105—which could include a wireless network—, or the like. Client devices 102-104 can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices 102-104 and the servers 106, 110, and 114 can each include at least one client application that is configured to receive content or data from another computing device. The client application can include a capability to provide and receive textual content, graphical content, audio content, authentication and keying information, and the like. The client application can further provide information that identifies itself, including a type, capability, name, and the like. In one embodiment, client devices 102-104 and the servers 106, 110, and 114 can each uniquely identify themselves through any of a variety of mechanisms. Client devices can be identifiable via a phone number, Mobile Identification Number (MIN), an electronic serial number (ESN), or another type of device identifier. Servers can be identifiable via an electronic serial number (ESN) or another type of device identifier.

In general, client devices 102-104 and servers 106, 110, and 114 can be capable of sending or receiving signals, such as via a wired or wireless network, or can be capable of processing or storing signals, such as in memory as physical memory states.

Network 105 is configured to couple devices 102-104 and servers 106, 110, and 114, or the like, with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, NetBEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications. A CDN or ADN can also enable an entity to operate or manage another's site infrastructure, in whole or in part.

The servers 106, 110, and 114 can include a device that includes a configuration to provide content such as interactive content via a network to another device. Such server(s) can, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. Such server(s) can also host a variety of other sites, including, but not limited to business sites, educational sites, dictionary sites, encyclopedia sites, wikis, financial sites, government sites, and the like. Devices that can operate as such server(s) include personal computers desktop computers, multiprocessor systems, microprocessor-based or programmable consumer electronics, network PCs, servers, and the like.

The servers 106, 110, and 114 can further provide a variety of services that include, but are not limited to, streaming and/or downloading media services, search services, email services, photo services, web services, social networking services, news services, third-party services, audio services, video services, instant messaging (IM) services, SMS services, MIMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content can include videos, text, audio, images, or the like, which can be processed in the form of physical signals, such as electrical signals, for example, or can be stored in memory, as physical states, for example.

Also, servers 106, 110, and 114 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models can be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

Servers 106, 110, and 114 can be capable of sending or receiving signals, such as via a wired or wireless network, or can be capable of processing or storing signals, such as in memory as physical memory states. Devices capable of operating as a server can include, as examples, dedicated rack-mounted servers, desktop computers, laptop computers, set top boxes, integrated devices combining various features, such as two or more features of the foregoing devices, or the like. Servers can vary widely in configuration or capabilities, but generally, a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 110, and 114. This can include in a non-limiting example, authentication servers, search servers, email servers, social networking services servers, SMS servers, IM servers, MMS servers, exchange servers, photo-sharing services servers, and travel services servers, via the network 105 using their various client devices. In some embodiments, applications, such as a mail or messaging application (e.g., Yahoo! ® Mail, Yahoo! ® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo! ® Search), and the like, can be hosted by servers 106, 110, and 114. Thus, servers 106, 110, and 114 can store various types of applications and application related information including application data and user profile information (e.g., identifying and behavioral information associated with a user). It should also be understood that servers 106, 110, and 114 can also store various types of data related to content and services provided by an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 110, and 114.

Moreover, although FIG. 1 illustrates servers 106, 110, and 114 as single computing devices, respectively, the disclosure is not so limited. For example, one or more functions of servers 106, 110, and 114 can be distributed across one or more distinct computing devices. Moreover, in one embodiment, servers 106, 110, and 114 can be integrated into a single computing device, without departing from the scope of the present disclosure.

Figure 2:
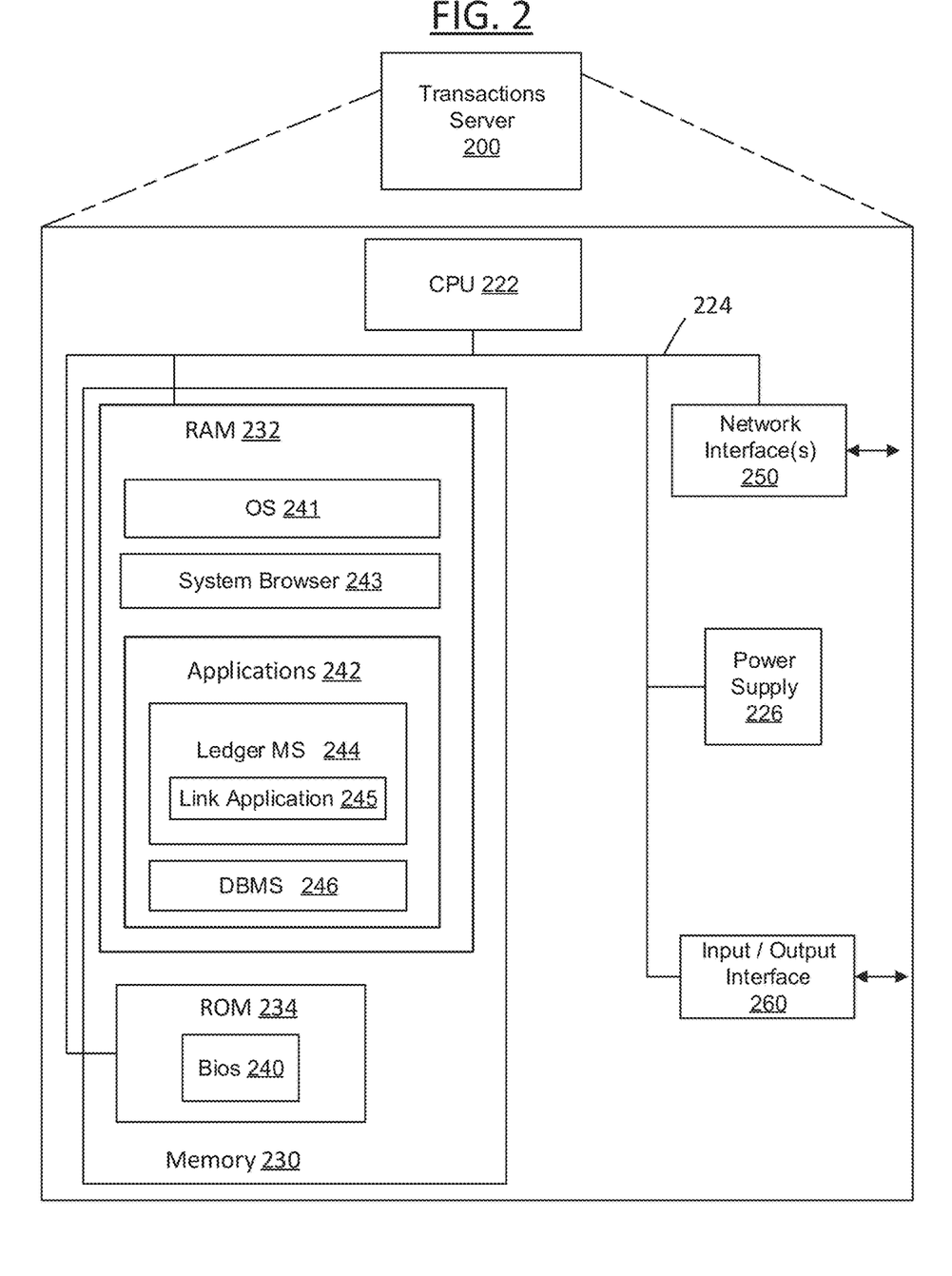
FIG. 2 is a schematic diagram illustrating an example of a transactions server (such as transactions server 110), in accordance with some embodiments of the present disclosure.

FIG. 2 is a schematic diagram illustrating a transactions server 200 showing an example embodiment of a server that can be used within the present disclosure. The transactions server 200 can include many more or less components than those shown in FIG. 2. However, the components shown are sufficient to disclose an illustrative embodiment for implementing some aspects the present disclosure. The transactions server 200 can represent, for example, the transaction server discussed above in relation to FIG. 1.

As shown in the figure, transactions server 200 includes a processing unit (CPU) 222 in communication with a mass memory 230 via a bus 224. Transactions server 200 also includes a power supply 226, one or more network interfaces 250, and an input/output interface 260 (which can include an audio interface, a display, a keypad, an illuminator, a global positioning systems (GPS) receiver, sensors, and an input/output interface to such devices).

Power supply 226 provides power to transactions server 200. A rechargeable or non-rechargeable battery can be used to provide power. The power can also be provided by an external power source, such as an AC adapter or a powered docking cradle that supplements and/or recharges a battery. Transactions server 200 can optionally communicate with a base station (not shown), or directly with another computing device. Network interface 250 includes circuitry for coupling transactions server 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of server 200. The mass memory also stores an operating system 241 in RAM 232 for controlling the operation of server 200. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs.

Figure 3:
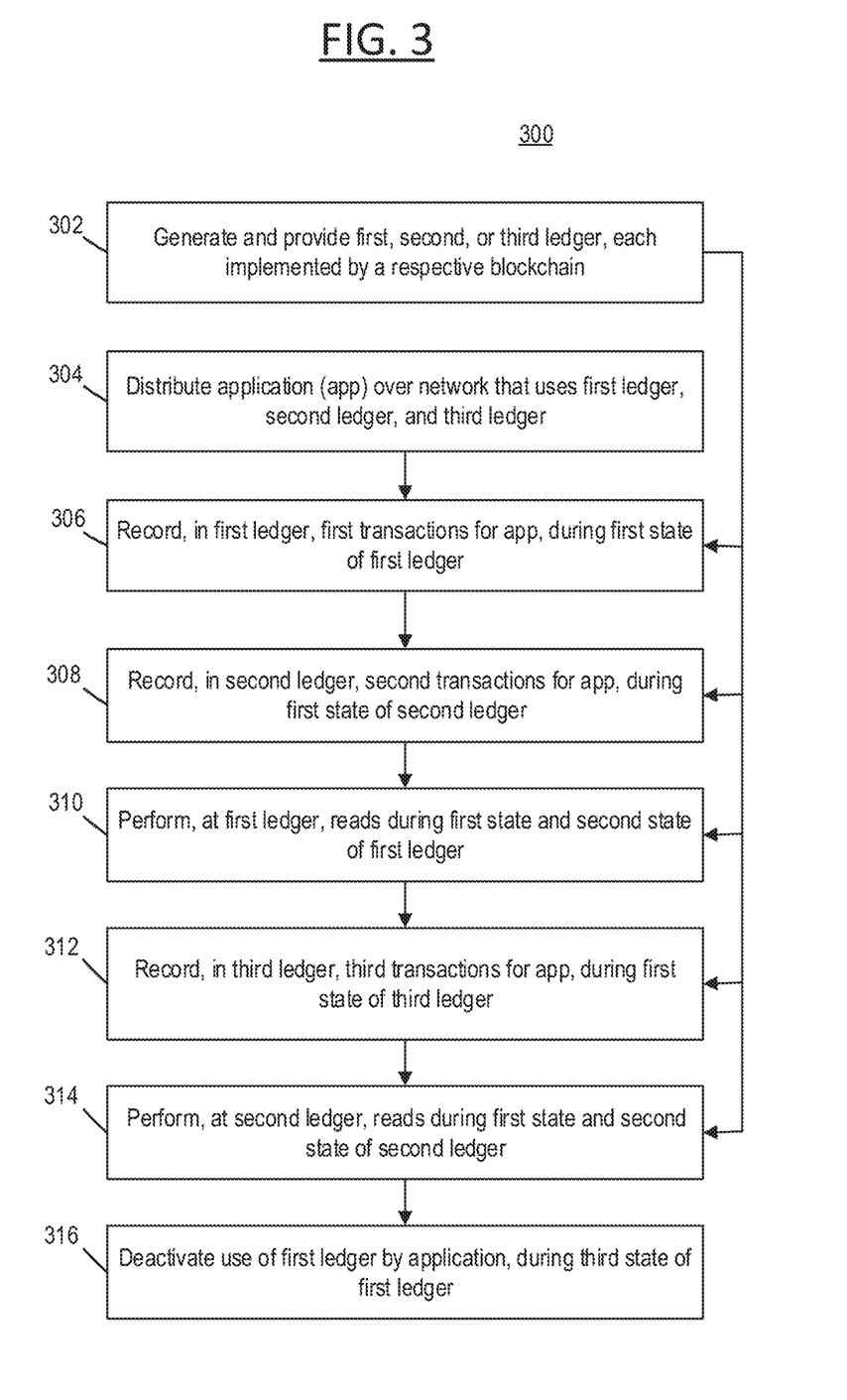
FIG. 3 is a flowchart illustrating an example method, in accordance with some embodiments of the present disclosure.
Figure 4:
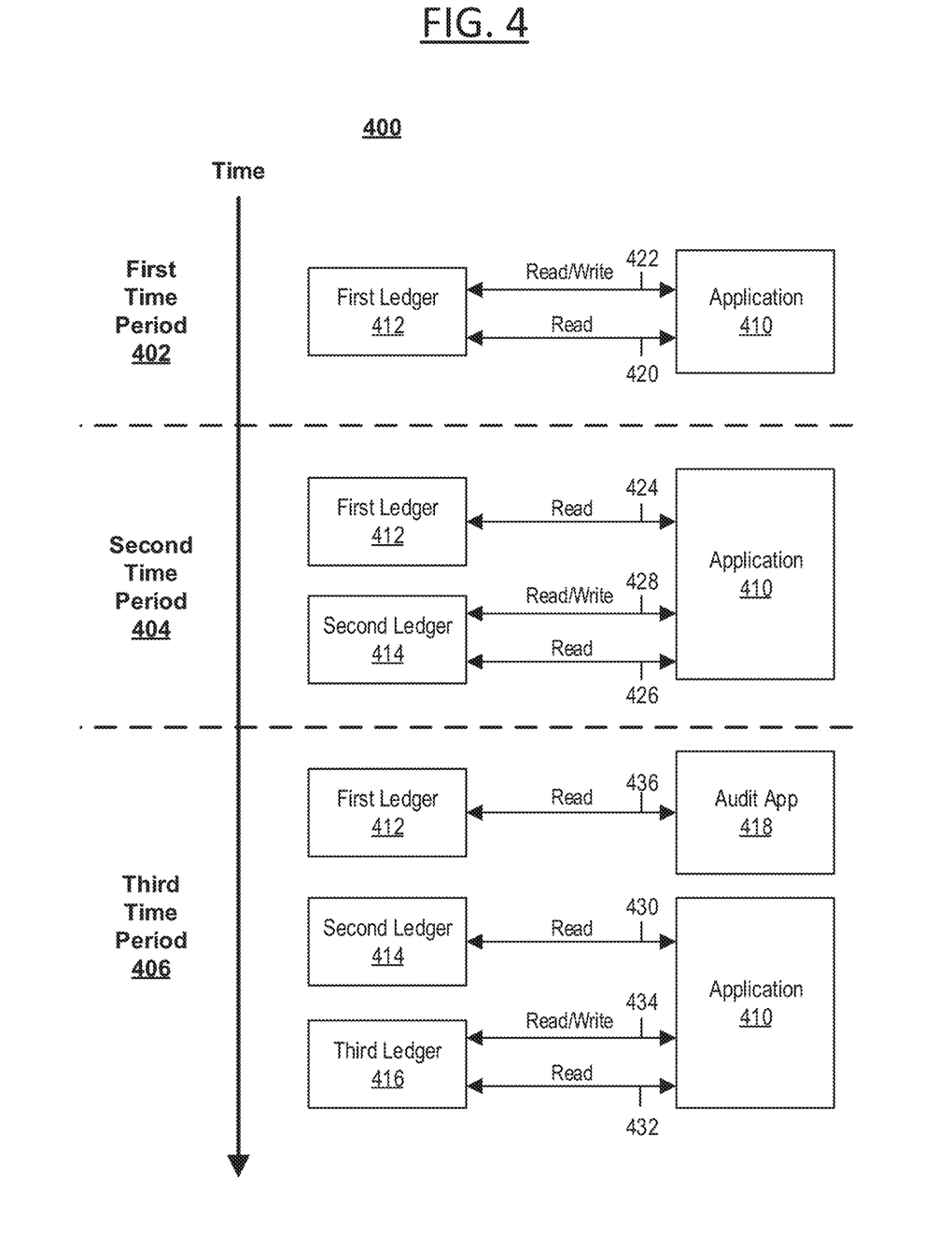
FIGS. 4 and 5 are schematic diagrams illustrating example operations in accordance with some embodiments of the present disclosure.
Figure 5:
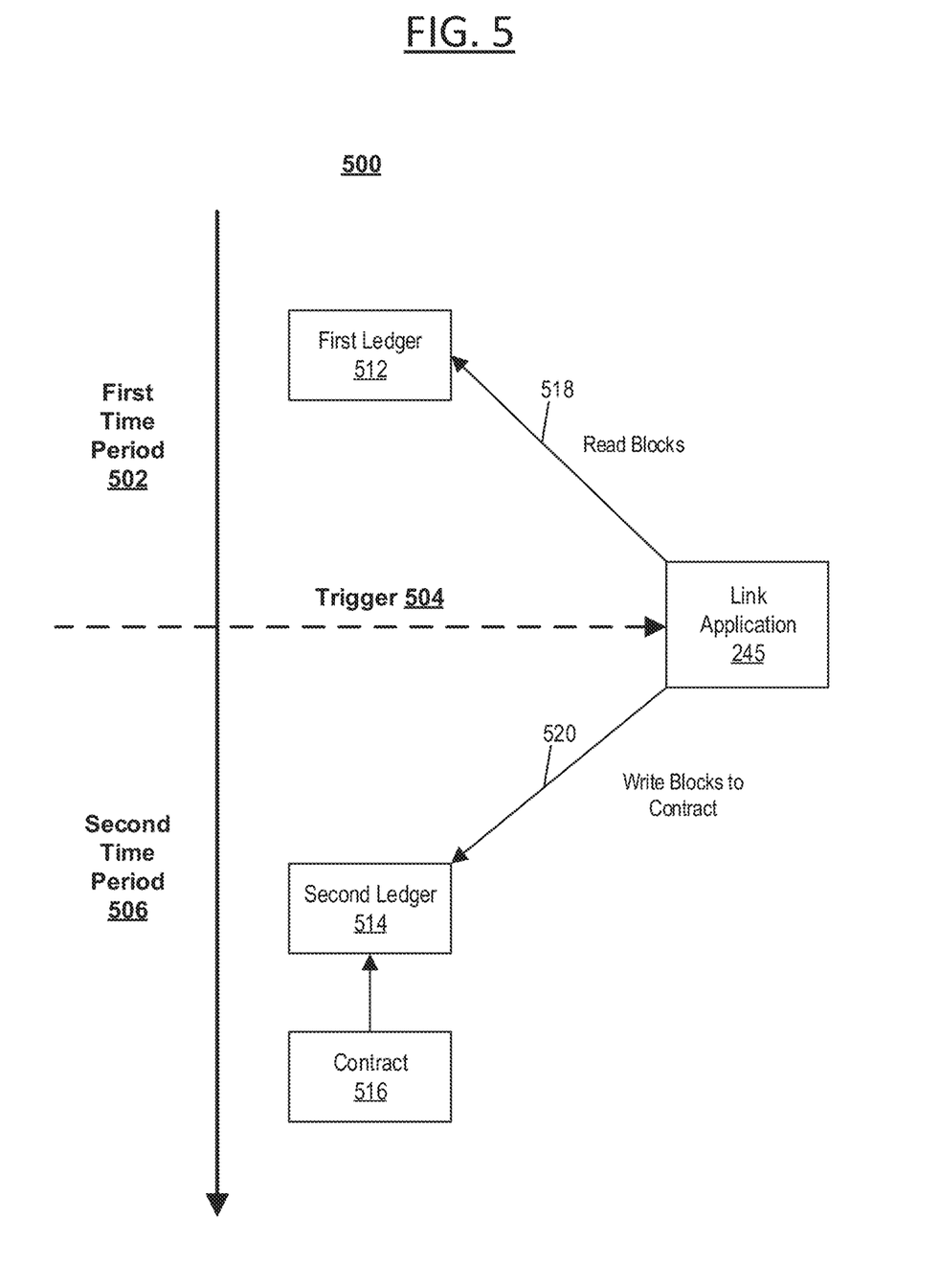

The mass memory also stores a system browser in RAM 232 for controlling operations of a system browser 243 and applications 242, such as ledger MS 244 (which can perform many of the operations described herein in relation to FIGS. 3-5), link application 245 (which can perform at least part of the linking between ledgers described herein), and a database management system 246 (which can manage a database, such as database 112, that can be used for storing and organizing data of the blockchain ledgers described herein).

Memory 230 further includes one or more data stores, which can be utilized by server 200 to store, among other things, the system browser 243, the applications 242 and/or other data. For example, data stores can be employed to store information that describes various capabilities of server 200. The information can then be provided to another device based on any of a variety of events, including being sent as part of a header during a communication, sent upon request, or the like. At least a portion of the capability information can also be stored on a disk drive or other storage medium (not shown) within server 200.

Applications 242 can include computer executable instructions which, when executed by server 200 or any of the other servers described herein, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

Having described components of the architecture example employed within the disclosed systems and methods, the components' operations with respect to the disclosed systems and methods will now be described below with reference to FIGS. 3-6.

In FIG. 3, process 300 details steps performed by one or more servers (such as one or more of the servers described herein) in accordance with some embodiments of the present disclosure. The steps are for managing growth of ledgers implemented by one or more blockchains. Process 300 begins with step 302, which includes one or more server computers generating and providing at least a first ledger, a second ledger, and a third ledger for recording transactions associated with an application distributed over the Internet.

The first, second, and third ledgers can each be implemented by a separate blockchain or can be implemented by single blockchain. In one embodiment, the ledgers are provided by a transactions server (such as transactions server 110 depicted in FIG. 1 or transactions server 200 depicted in FIG. 2). In some other embodiments the ledgers are provided by an application server (such as application server 106) that is distributing the application. In some other embodiments, the transactions server distributes the application and provides the ledgers. Also, a third server (such as third server 114) can distribute the applications and/or provide the ledgers. In step 304, one or more servers (such as the application server 106, the transactions server 110, and/or the third server 114) distributes an application over a network (such as network 105) that uses at least the first, second, and third ledgers for recording transactions associated with the application.

In step 306, one or more servers (such as such as application server 106, transactions server 110, and/or third server 114) record, in the first ledger, first set of transactions associated with the application, during a first state of the first ledger. In step 306, the first ledger can be an initial ledger and considered a current ledger by the server(s). During step 306, the second and third ledgers may not exist yet.

In step 308, the server(s) record, in the second ledger at the same node as the first ledger, second set of transactions associated with the application, during a second state of the first ledger and a first state of the second ledger. The second ledger can be a ledger generated before or after the first ledger. Thus, the second ledger can be the initial ledger. Also, the first and second ledgers can be generated one after the other or another ledger can be generated at a time in between the generation of the first and second ledgers. In step 308, the first ledger can be considered a previous ledger by the server(s). Also, in step 308, the second ledger can be considered a current ledger by the server(s).

In step 310, the server(s) perform, at the first ledger, reads on the first set of transactions associated with the application, during the first state and the second state of the first ledger. When the first ledger is in the first state it can be considered a current ledger by the server(s). When the first ledger is in the second state it can be considered a previous ledger by the server(s).

In some embodiments, the server(s) can generate, at a blockchain node, a first ledger implemented by a first blockchain for recording first set of transactions associated with an application distributed over the Internet so as to separate recordings of the application's transactions into a plurality of smaller blockchains instead of using one larger blockchain. In such embodiments, the server(s) can record during a first state of the first ledger, in the first ledger, the first set of transactions. The server(s) can also generate, at the blockchain node, a second ledger implemented by a second blockchain for recording second set of transactions associated with the application to continue to separate recordings of the application's transactions into the plurality of smaller blockchains. The server(s) can also prohibit, during a second state of the first ledger, recording the second set of transactions in the first ledger. The server(s) can also record during the second state of the first ledger and a first state of the second ledger, in the second ledger, the second set of transactions since recording transactions in the first ledger during the second state of the first ledger is prohibited. The server(s) can also permit, during the first state and the second state of the first ledger, reading of the first set of transactions at the first ledger. The server(s) can also perform during the first state and the second state of the first ledger, at the first ledger, reading of the first set of transactions since reading transactions in the first ledger during the first and second states of the first ledger is permitted.

In step 312, the server(s) record, in the third ledger at the same node as the first ledger and the second ledger, third set of transactions associated with the application, during a third state of the first ledger, a second state of the second ledger, and a first state of the third ledger. The third ledger can be a ledger generated before or after the first ledger and/or the second ledger. Thus, the second ledger can be the initial ledger. Also, the first, second, and third ledgers can be generated one after the other or other ledgers can be generated at times in between the generation of the first, second, and third ledgers. In step 312, the first and second ledgers can be considered previous ledgers by the server(s). Also, in step 312, the third ledger can be considered a current ledger by the server(s).

In step 314, the server(s) perform, at the second ledger, reads on the second set of transactions associated with the application, during the first state and the second state of the second ledger. When the second ledger is in the first state it can be considered a current ledger by the server(s). When the second ledger is in the second state it can be considered a previous ledger by the server(s). Likewise, when the third ledger is in the first state it can be considered a current ledger by the server(s), and when the third ledger is in the second state it can be considered a previous ledger by the server(s).

In some embodiments, the server(s) can generate, at the blockchain node, a third ledger implemented by a third blockchain for recording third set of transactions associated with the application to continue to separate recordings of the application's transactions into the plurality of smaller blockchains. The server(s) can also prohibit, during a second state of the second ledger, recording the third set of transactions in the second ledger. The server(s) can also record during a third state of the first ledger, the second state of the second ledger, and a first state of the third ledger, in the third ledger, the third set of transactions since recording transactions in the second ledger during the second state of the second ledger is prohibited and since recording transactions in the first ledger during the third state of the first ledger is prohibited. The server(s) can also permit, during the first state and the second state of the second ledger, reading of the second set of transactions at the second ledger. The server(s) can also perform during the first state and the second state of the second ledger, at the second ledger, reading of the second set of transactions since reading transactions in the second ledger during the first and second states of the second ledger is permitted.

In step 316, the server(s) deactivate use of the first ledger by the application, during the third state of the first ledger. Similarly, the server(s) can deactivate use of the second ledger by the application, during a third state of the second ledger. Also, the server(s) can deactivate use of the third ledger by the application, during a third state of the third ledger. To put it another way, the third state of a ledger can represent a state that the ledger cannot be accessed for use by the application. The deactivation or archiving of one or more previous ledgers can occur in the third state or a later state than the third state wherein the states of ledgers are temporal states. Also, the application or the server(s) can determine when to deactivate one or more previous ledgers based on properties of data in the previous ledger(s).

Also, the second state of a ledger can represent a state that the ledger can be read from by the application, and the first state of a ledger can represent a state that the ledger can be read from or written on by the application.

In some embodiments, the server(s) can invoke reads of transactions in parallel across the first ledger and the second ledger, during at least the second state of the first ledger. This can occur when the second ledger is in the first state or the second state. In such embodiments, the server(s) can collate responses associated with the reads of transactions invoked in parallel. This can occur when the reads on transactions occur on the third ledger or other ledgers too. Reads on transactions can occur in parallel on the ledger considered current by the application or the server(s) and can occur in parallel on all active ledgers considered previous ledgers, unless such a ledger has been deactivated from use by the application. For example, the server(s) can also invoke reads on transactions in parallel across the second ledger and the third ledger, during the third state of the first ledger, the second state of the second ledger, and the first state of the third ledger.

In some embodiments, each state of the states of the ledgers is configurable. For example, the first, second, and third states of a ledger can be configurable. Also, the first, second, and third states of all the ledgers can be configurable. Configuration can occur per state per ledger, or per ledger, or per state type.

Each state of the states of the ledgers can be defined by a time period. For example, the time period of the first state of the first ledger can be immediately prior to the time period of the second state of the first ledger, and the time period of the second state of the first ledger is immediately prior to the time period of the third state of the first ledger. This can be the configuration for the other ledgers as well. Also, each state of the states of the ledgers can be defined by a size of a ledger. Additional or alternative triggers or parameters can initiate or differentiate the states of ledgers as well. Also, the states of the ledgers can be defined by parameters or attributes of the ledgers themselves or by the state of the application or even states of the server(s), or some combination thereof.

In some embodiments, the process 300 can further include the server(s) archiving the first ledger in that the blockchain associated with the first ledger is retrievable by a second application (such as an archiving application), during the third state of the first ledger. This can be the same for the second and third ledgers as well as other ledgers used by the application. The second application is a separate application from the application that uses the ledgers while the ledgers are in the first or second state.

The server(s) can link a current ledger with its immediate previous ledger to create a link between the ledgers. In some embodiments, the server(s) can link a current ledger with a previous ledger that is not necessarily the immediate previous ledger. For example, in some embodiments, the process 300 can further include the server(s), before initiating the second state of the first ledger and the first state of the second ledger, executing a first link application configured to link the first ledger and the second ledger. Also, before initiating the second state of the first ledger and the first state of the second ledger, the sever(s) can generate a first link application configured to link the first ledger and the second ledger. The server(s) can also link the first ledger and the second ledger according to the first link application, during the second state of the first ledger and the first state of the second ledger. Also, for example, the server(s), before initiating the third state of the first ledger, the second state of the second ledger, and the first state of the third ledger, can generate and/or execute a second link application configured to link the second ledger and the third ledger. The server(s) can also link the second ledger and the third ledger according to the second link application, during the third state of the first ledger, the second state of the second ledger, and the first state of the third ledger.

Also, in some embodiments, the server(s) can retrieve, by the first link application, a predetermined number of blocks from the blockchain of the first ledger to support the link between the first ledger and the second ledger. The predetermined number of blocks can include at least the last block of the blockchain and one or more blocks directly adjacent to the last block. Also, the determination of the number of blocks can occur in other ways to link adjacent ledgers. For example, blocks of the blockchain can be selected from anywhere in the previous ledger or from a last set of blocks in previous ledger. Further, the predefined number of blocks can be configurable by a user, the application, or the server(s).

In some embodiments, a non-transitory computer-readable storage medium tangibly encoded with computer-executable instructions can perform the process 300 when the instructions are executed by a processor of a computing device. In such examples, the process 300, performed by the instructions, can include distributing an application over a network that uses a first ledger for recording transactions associated with the application (e.g., see step 304). As mentioned, the first ledger is implemented by a blockchain. The process 300, performed by the instructions, can also include recording, in the first ledger, first set of transactions associated with the application, during a first state of the first ledger (e.g., see step 306). The process 300, performed by the instructions, can also include recording, in a second ledger at the same node as the first ledger, second set of transactions associated with the application, during a second state of the first ledger and a first state of the second ledger (e.g., see step 308). And, the second ledger is implemented by a blockchain as well.

The process 300, performed by the instructions, can also include performing, at the first ledger, reading the first set of transactions associated with the application, during the first state and the second state of the first ledger (e.g., see step 310). The process 300, performed by the instructions, can also include recording, in a third ledger at the same node as the first ledger and the second ledger, third set of transactions associated with the application, during a third state of the first ledger, a second state of the second ledger, and a first state of the third ledger. And, the third ledger can be implemented by a blockchain as well. The process 300, performed by the instructions, can also include performing, at the second ledger, reading second set of transactions associated with the application, during the first state and the second state of the second ledger. The process 300, performed by the instructions, can also include deactivating use of the first ledger by the application, during the third state of the first ledger.

The instructions of the non-transitory computer-readable storage medium can also be executed to perform the other processes of and related to process 300.

Also, relevant to FIG. 3, some embodiments can include a system having an application server and a transactions server. The application server can have a processor and a non-transitory computer-readable storage medium for tangibly storing thereon program logic for execution by the processor of the application server. The program logic of the application server can include executable logic for distributing an application over the Internet that uses a first ledger for recording transactions associated with the application. The first ledger being implemented by a blockchain.

Also, the transactions server can have a processor and a non-transitory computer-readable storage medium for tangibly storing thereon program logic for execution by the processor of the transactions server. The program logic of the transactions server can include executable logic for recording, in the first ledger, first set of transactions associated with the application, during a first state of the first ledger. The program logic of the transactions server also can include executable logic for recording, in a second ledger at the same node as the first ledger, second set of transactions associated with the application, during a second state of the first ledger and a first state of the second ledger. The second ledger can also be implemented by a blockchain. The program logic of the transactions server also can include executable logic for performing, at the first ledger, reading of first set of transactions associated with the application, during the first state and the second state of the first ledger.

The program logic of the transactions server also can include executable logic for recording, in a third ledger at the same node as the first ledger and the second ledger, third set of transactions associated with the application, during a third state of the first ledger, a second state of the second ledger, and a first state of the third ledger. And, the third ledger can be implemented by a blockchain as well. The program logic of the transactions server also can include executable logic for performing, at the second ledger, reading of second set of transactions associated with the application, during the first state and the second state of the second ledger. The program logic of the transactions server also can include executable logic for deactivating use of the first ledger by the application, during the third state of the first ledger.

The program logic of the transactions server also can include executable logic to perform the other processes of and related to process 300. For example, the program logic of the transactions server also can include executable logic for configuring each state of the states of the ledgers, by a user (via a GUI), the application, or one or more of the servers.

As mentioned herein, transaction executions on the ledgers can be divided into at least two types of processes, a read process and a read and write process (read/write process). The read process can include a request for data previously stored on a ledger. For example, the read process can include the reading operations of steps 310 and 314 of process 300. The read/write process can include submitting data to be stored and/or processed on a ledger. For example, the read/write process can include the recording operations of steps 306, 308, and 312 of process 300.

Applications can execute one or more of the aforementioned transaction types on a ledger in performance of the application or upon requests of the users of the application or the server(s) managing the ledgers. The transactions can be included in blocks of the blockchains implementing the ledgers, and the read/write transactions can be recorded on a ledger; thus, leading to significant growth of ledgers, in some embodiments.

As the growth of ledger can be in a chronological fashion or a size fashion in some embodiments, the solutions to manage and control ledger storage growth can focus on at least four example general solutions. The first example solution of the four general solutions includes a fixed-time-duration- or size-based ledger for recording the read/write transactions. Fixed-time-duration base ledgers can be determined or configured by the application using the ledgers and could be determined to be defined by one year or multiple years, one month or multiple months, one day or multiple days, or some other time period based option. Size-base ledgers can be determined or configured by the application using the ledgers and could be determined to be defined by size limits of the ledger such as one GB or multiple GB size limit of a ledger.

The second example solution of the four solutions includes the server(s) or the application looking-up or retrieving transactions from multiple ledgers, such as performing the reads on multiple ledgers. Such operations can occur on a ledger considered "current" or "previous" by the application or the server(s). It for example, reads can be from one or more previous fixed-time-duration based ledgers or size-based ledgers. The read can be determined and executed by the application on the basis of validity period of data associated with the application, including ephemeral data.

The third example solution includes creating a linkage across each of the previous ledgers in a chronological fashion such that transactional integrity is maintained across ledgers. The size of a link can be determined by application requirements associated with transaction integrity, auditing and data retention. Also, a most current application state can be migrated from one ledger to another to create or support a link.

The fourth example solution includes deactivating and archiving functions to close down and optionally archive ledgers that are deemed to contain transactions no longer used by or useful for the application.

FIGS. 4 and 5 depict schematic diagrams illustrating example operations 400 and 500 in accordance with some embodiments of the present disclosure, which bring together at least the aforementioned exemplary four solutions.

For ease of understanding aspects of the disclosure, the description of FIG. 4 and FIG. 4 itself illustrate example uses of fixed-time-duration based ledgers by an application, wherein each ledger is associated as a current ledger by the application according to a respective time period. In FIG. 4, the respective time periods include first time period 402, second time period 404, and third time period 406. The application 410 associates the first ledger 412, the second ledger 414, or the third ledger 416 as a current ledger according to the time period 402, 404, or 406, respectively. For example, the first ledger 412 can be considered the current ledger by the application 410 in the first time period 402. The second ledger 414 can be considered the current ledger by the application 410 in the second time period 404. And, the third ledger 416 can be considered the current ledger by the application 410 in the third time period 406.

The operations 400 can begin in the first time period 402 (e.g., the year of 2018). At the beginning or the deployment start of the application 410, the application can use a single ledger (first ledger 412) for performing both read transactions 420 and read/write transactions 422 associated with the first time period 402 since the first ledger is the current ledger. As the next time period approaches or starts, or the second time period 404 approaches or starts (e.g., year of 2019), a new ledger, such as the second ledger 414, is deployed on the same node as the first ledger 412. This can occur at the end of the first time period 402 or the beginning of the second time period 404. Alternatively, multiple ledgers can be deployed on their respective nodes. Also, in some embodiments, multiple ledgers can be deployed on the same node, on their respective nodes, or some combination thereof.

Also, in the second time period 404, the state of the first ledger 412 is changed from being considered the current ledger to a previous ledger.

During the second time period 404, the application 410 has access to both the first ledger 412 and the second ledger 414. Specifically, the first ledger 412 can be used by the application 410 for performing read transactions 424 associated with the second time period 404 since the second ledger is a previous and active ledger, and the second ledger 414 can be used by the application for performing read transactions 426 and read/write transactions 428 associated with the second time period 404 since it is the current ledger. Read transactions can be invoked in parallel across the multiple ledgers and responses to the reads can be collated in parallel. Also, the number of previous ledgers to use can be configurable and can be application defined based on data of a ledger's use or usefulness to the application 410.

As the next time period approaches or starts, or the third time period 406 approaches or starts (e.g., year of 2020), a new ledger, such as the third ledger 416, is deployed on the same node as the first ledger 412 and the second ledger 414. This can occur at the end of the second time period 404 or the beginning of the third time period 406. Alternatively, multiple ledgers can be deployed on their respective nodes. Also, in some embodiments, multiple ledgers can be deployed on the same node, on their respective nodes, or some combination thereof.

Also, in the third time period 406, the state of the second ledger 414 can be changed from being considered the current ledger to a previous ledger.

During the third time period 406, the application 410 has access to both the second ledger 414 and the third ledger 416, and the third ledger is considered the current ledger by the application. During the third time period 406, the application 410 does not have access to the first ledger 412 because it is a previous ledger and a deactivated ledger for the application 410. Specifically, the second ledger 414 can be used by the application 410 for performing read transactions 430 associated with the third time period 406 since it is a previous and active ledger, and the third ledger 416 can be used by the application for performing read transactions 432 and read/write transactions 434 associated with the third time period 406 since it is the current ledger. Read transactions can be invoked in parallel across the multiple ledgers and responses to the reads can be collated in parallel. Also, the number of previous ledgers to use can be configurable and can be application defined based on data of a ledger's use or usefulness to the application 410.

As the next time period approaches or starts (not depicted), a new ledger, such as a fourth ledger (not depicted), is deployed on the same node as the first ledger 412, the second ledger 414, and the third ledger 416. This can occur at the end of the third time period 406 or the beginning of the next time period after the third time period. These operations can be continued and repeated as the number of ledgers grow. Alternatively, multiple ledgers can be deployed on their respective nodes. Also, in some embodiments, multiple ledgers can be deployed on the same node, on their respective nodes, or some combination thereof.

Also shown in third time period 406, is the read transaction 436 on the first ledger 412. The read transaction 436 on the first ledger 412 can be made accessible by the server(s) for use by an auditing application 418. The auditing application 418 is a separate application from application 410. Thus, as shown in FIG. 4, the first ledger 412 can be deactivated by the server(s) with respect to use by the application 410 (e.g., see step 316 of process 300). However, in the third time period 406, at least the first ledger 412, is activated by the server(s) with respect to use by the auditing application 418.

In some embodiments, based on an application's defined use for example, ledgers considered previous ledgers by the application can be determined by the application or the server(s) to be useable by the application or a different application such as an archiving or auditing application. For example, a ledger associated with a time period immediately before a current time period can be considered a previous ledger by the application but still made active and useable for the application. In such an example, a ledger associated with a time period not immediately before the current time period (such as one or more time periods prior to the immediate prior time period) can be considered a previous ledger by the application but deactivated for use by the application by the server(s) hosting the ledgers or deactivated by the application itself. This older or not to be used ledger can be optionally archived based on application requirements associated with auditing and retention of data requirements. And, such a ledger can be made accessible by an auditing or archiving application (such as auditing application 418).

With such solutions, as illustrated by FIG. 4 and corresponding text, the growth of ledgers for an application is controlled and managed. Also, an application is provided the ability to decide on how to manage ledgers that no longer have useable transactions for the application. Whether or not a transaction is a "useable" transaction can be dependent on a determination by the application and/or the server(s) hosting the ledgers. The solutions address the blockchain storage growth problem; however, the solutions related to FIG. 4, can introduce problems associated with blockchain transaction integrity (e.g., the ability of blockchains to maintain immutability and integrity of transactions by aggregating multiple transactions within a block along with hashes of the previous blocks thus creating a dependency chain).

In order to address the above problems associated with blockchain transaction integrity, a solution that creates a linkage between the ledgers can be provided by the server(s) hosting the ledgers or server(s) communicatively coupled to the server(s) hosting the ledgers.

FIG. 5 depicts a schematic diagram illustrating example operations 500 in accordance with some embodiments of the present disclosure for creating a blockchain linkage between the ledgers used by an application. For ease of understanding aspects of the disclosure, the description of FIG. 5 and FIG. 5 itself illustrate example uses of fixed-time-duration based ledgers by an application, wherein each ledger is associated as a current ledger by the application according to a respective time period. In FIG. 5, the respective time periods include first time period 502 and a second time period 506, as well as a triggering event 504 overlapping or in between the time period 502 and 506. The application can associate the first ledger 512 and the second ledger 514 as a current ledger according to the time period 502 and 506, respectively. For example, the first ledger 512 can be considered the current ledger by the application in the first time period 502. The second ledger 514 can considered the current ledger by the application in the second time period 506.

The blockchain linking for the ledgers 512 and 514 can be performed at the time when the application transitions from using the first ledger as the current ledger to the second ledger as the new current ledger. The transition from using the first ledger as the current ledger to the second ledger as the new current ledger can be the triggering event 504. The triggering event 504 can cause the linking of the blockchains implementing 512 and 514.

The server(s) (such as the server(s) hosting the ledgers) can link a current ledger (such as ledger 514) with its immediate previous ledger (such as ledger 512) to create a link between the ledgers via a link application (such as link application 245 depicted in FIG. 5 and FIG. 2). In some embodiments, the server(s) can link a current ledger with a previous ledger that is not necessarily the immediate previous ledger. For example, in some embodiments, the operations 500 can further include the server(s), before initiating the second state of the first ledger and the first state of the second ledger during the first time period 502 or the triggering event 504, executing link application 245 configured to link the first ledger and the second ledger. The server(s) can also link the first ledger and the second ledger according to link application 245, during the second state of the first ledger and the first state of the second ledger during the second time period 506.

Also, in some embodiments, the server(s) can retrieve, by link application 245, a predetermined number of blocks from the blockchain of the first ledger to support the link between the first ledger and the second ledger. The predetermined number of blocks can include at least the last block of the blockchain and one or more blocks directly adjacent to the last block. Also, the determination of the number of blocks can occur in other ways to link adjacent ledgers. For example, blocks of the blockchain can be selected from anywhere in the previous ledger or from a last set of blocks in previous ledger. Further, the predefined number of blocks can be configurable by a user, the application, or the server(s).

As depicted in FIG. 5, in order to maintain transactional integrity across ledgers, during the first time period 502, the application uses the first ledger 512 for at least read transactions on the blocks of the blockchain of the first ledger. In the first time period 502, only the first ledger 512 is used by the application. Also, read/write transactions can occur with the first ledger 512 in the first time period 502. As the next time period approaches, such as during the triggering event 504, a new ledger (second ledger 514) is deployed on the same node and the first ledger 512. Alternatively, multiple ledgers can be deployed on their respective nodes. Also, in some embodiments, multiple ledgers can be deployed on the same node, on their respective nodes, or some combination thereof.

During the triggering event 504 and/or during the beginning of the second time period 504, a smart contract 516 for the block chains of the first ledger 512 and second ledger 514 is installed in the second ledger. During the second time period 506 or during the triggering event 504, the link application 245 can be activated. Within the second time period 506, read/write transactions are no longer performed on the first ledger by the application, but read/write transactions can be performed on the second ledger 514.

As shown in FIG. 5, at least during the first time period, the link application 245 can read blocks from the first ledger 512 in read operation 518, so that such blocks can be written or recorded to the smart contract 516 in write operation 520. As shown, write operation 520 occurs during the second time period 506 since the smart contract 516 is part of the second ledger 514 during the second time period and the server(s) only perform read/write transactions with the second ledger during the second time period in FIG. 5.

The read blocks at read operation 518 can include a predetermined number of blocks (such as a minimum of three blocks) of the first ledger 512. The number of blocks that can be read and retrieved by the link application 245 can be determined by the application, users of the application, or the server(s). The number of blocks can be determined automatically by the application or the server(s) according to the integrity requirements for transaction data of the blockchains for the application. The number of blocks can be proportional to the integrity requirements. And, weights in determinations of the number of blocks can be selected by users of the application or an automated process. Also, configuration of the number of blocks can include a limit on the predetermined number of blocks to prevent performance issues with the linking by the linking application 245.

After the triggering event 504, the link application 245 can store all the retrieved representative blocks from the first ledger 512. At this point, the link application 245 has established blockchain integrity across the ledgers 512 and 514. And, the ability to use multiple ledgers and maintain a transaction integrity link across ledgers enables the application using the ledgers to manage and control storage growth of the ledgers while maintaining integrity of the multiple blockchains implementing the ledgers. The states of the ledgers can be stored within the smart contract 516 to maintain additional integrity. Also, the smart contract of each ledger can include the data from the smart contract of one or more previous ledgers. For example, the smart contract of each ledger can include the data from the smart contract of the immediate previous ledger or data from the smart contracts of the immediate previous set of ledgers. Optionally, the smart contract of each ledger can include the data from the smart contracts of all previous ledgers for the application.

Figure 6:
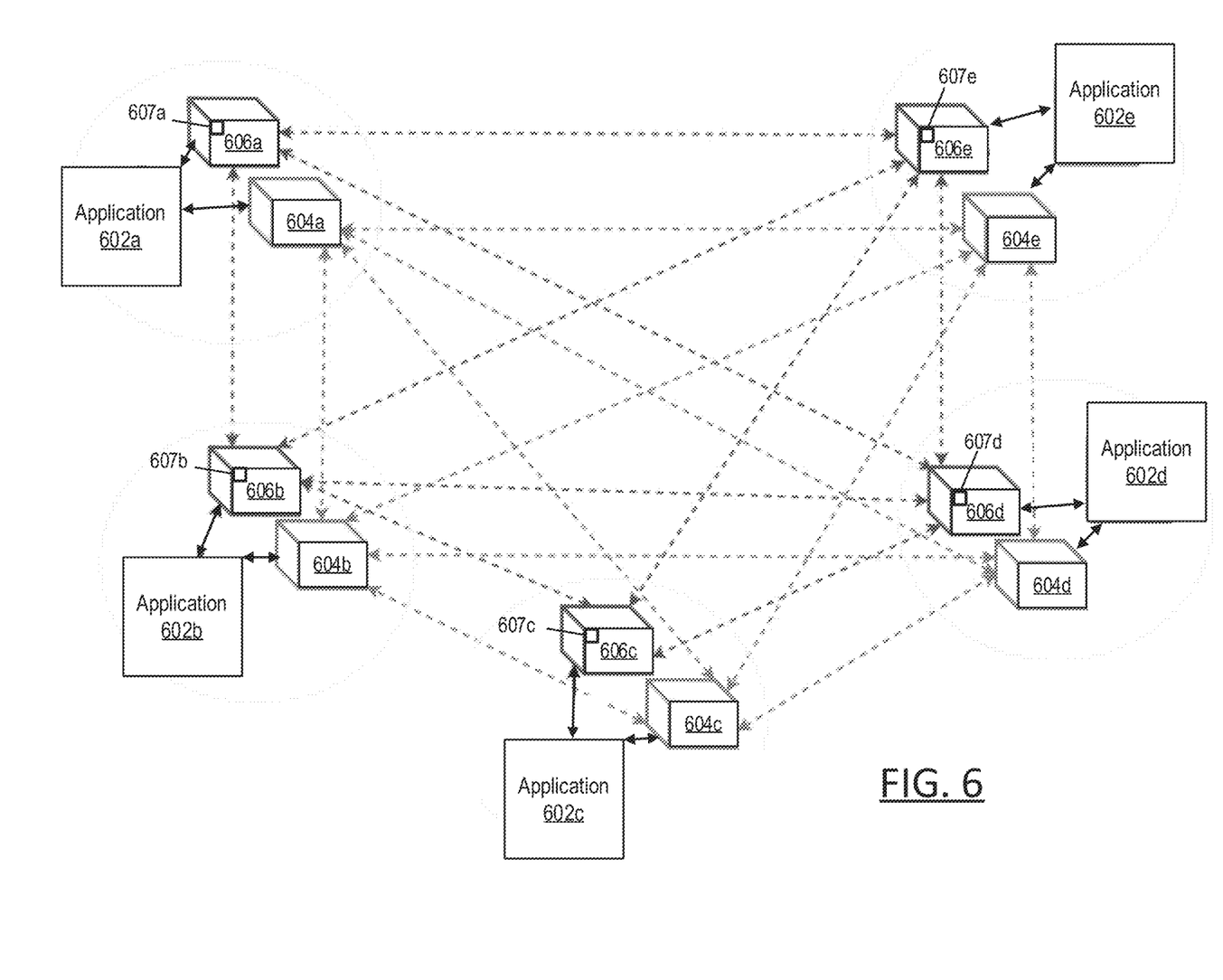
FIG. 6 depicts a blockchain network schematic diagram in accordance with some embodiments of the present disclosure.

FIG. 6 depicts a blockchain network schematic diagram in accordance with some embodiments of the present disclosure. FIG. 6 shows a network 600 including instances of an application (application instances 602a-602e) and instances of blockchain ledgers used by the application (ledger instances 604a-604e and 606a-606e). The network 600 can represent instances of the application and its ledgers used by different clients (such as used by client devices 102, 103, and 104 depicted in FIG. 1). The instances of the blockchain ledgers are being executed from one or more servers—such as from the transactions server 110 and/or the third server 114. The instances of the application are being executed and served to the clients of the application from one or more servers as well—such as from the application server 106 and/or the third server 114. As shown, each of the ledger instances 606a-606e includes a respective smart contract instance (smart contract instance 607a, 607b, 607c, 607d, or 607e) since a respective ledger of ledger instances 606a-606e occurs after a respective ledger of ledger instances 604a-604e.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising:
generating, at a blockchain node, a first ledger implemented by a first blockchain for recording a first set of transactions associated with an application distributed over the Internet so as to separate recordings of the application's transactions into a plurality of smaller blockchains, instead of using one larger blockchain, for recording the application's transactions;
recording during a first state of the first ledger, in the first ledger, the first set of transactions;
generating, at the blockchain node, a second ledger implemented by a second blockchain for recording a second set of transactions associated with the application to continue to separate recordings of the application's transactions into the plurality of smaller blockchains for recording the application's transaction;
prohibiting, during and after a second state of the first ledger, recording the second set of transactions in the first ledger; and
linking the first ledger and the second ledger.

2. The method of claim 1, further comprising:
recording during the second state of the first ledger and a first state of the second ledger, in the second ledger, the second set of transactions since recording these transactions in the first ledger during and after the second state of the first ledger is prohibited;
permitting, during the first state and the second state of the first ledger, reading of the first set of transactions at the first ledger; and
performing during the first state and the second state of the first ledger, at the first ledger, reading of the first set of transactions since reading transactions in the first ledger during the first and second states of the first ledger is permitted.

3. The method of claim 2, further comprising:
generating, at the blockchain node, a third ledger implemented by a third blockchain for recording a third set of transactions associated with the application to continue to separate recordings of the application's transactions into the plurality of smaller blockchains;
prohibiting, during and after a second state of the second ledger, recording the third set of transactions in the second ledger;
recording during a third state of the first ledger, the second state of the second ledger, and a first state of the third ledger, in the third ledger, the third set of transactions since recording transactions in the second ledger during the second state of the second ledger is prohibited and since recording transactions in the first ledger during the third state of the first ledger is prohibited;
permitting, during the first state and the second state of the second ledger, reading of the second set of transactions at the second ledger; and
permitting, during the first state and the second state of the second ledger, at the second ledger, reading of the second set of transactions.

4. The method of claim 3, further comprising: deactivating use of the first ledger by the application, during the third state of the first ledger.

5. The method of claim 2, further comprising: invoking reads in parallel across the first ledger and the second ledger, during the second state of the first ledger.

6. The method of claim 5, further comprising: collating responses associated with the reads invoked in parallel.

7. The method of claim 3, further comprising: invoking reads in parallel across the second ledger and the third ledger, during the third state of the first ledger, the second state of the second ledger, and the first state of the third ledger.

8. The method of claim 3 wherein each state of the states of the ledgers is configurable.

9. The method of claim 3, wherein each state of the states of the ledgers is defined by a time period.

10. The method of claim 9, wherein the time period of the first state of the first ledger is immediately prior to the time period of the second state of the first ledger, and wherein the time period of the second state of the first ledger is immediately prior to the time period of the third state of the first ledger.

11. The method of claim 3, wherein each state of the states of the ledgers is defined by a size of a ledger.

12. The method of claim 3, further comprising: archiving the first ledger in that the blockchain of the first ledger is retrievable by a second application, during the third state of the first ledger.

13. The method of claim 1, the linking further comprising:
before initiating the second state of the first ledger and the first state of the second ledger, executing a first link application configured to link the first ledger and the second ledger; and
linking the first ledger and the second ledger according to the first link application, during the second state of the first ledger and the first state of the second ledger.

14. The method of claim 13, further comprising: retrieving, by the first link application, a predefined number of blocks from the blockchain of the first ledger to support the link between the first ledger and the second ledger.

15. The method of claim 14, wherein the predefined number of blocks comprise at least the last block of the blockchain and one or more blocks directly adjacent to the last block.

16. The method of claim 14, wherein the predefined number of blocks is configurable.

17. The method of claim 3, further comprising:
before initiating the third state of the first ledger, the second state of the second ledger, and the first state of the third ledger, executing a second link application configured to link the second ledger and the third ledger; and
linking the second ledger and the third ledger according to the second link application, during the third state of the first ledger, the second state of the second ledger, and the first state of the third ledger.

18. A non-transitory computer-readable storage medium tangibly encoded with computer-executable instructions, that when executed by a processor associated with a computing device, performs a method, the method comprising:
distributing an application over a communications network;
generating, at a blockchain node, a first ledger implemented by a first blockchain for recording a first set of transactions associated with the application so as to separate recordings of the application's transactions into a plurality of smaller blockchains, instead of using one larger blockchain, for recording the application's transactions;
recording during a first state of the first ledger, in the first ledger, the first set of transactions;
generating, at the blockchain node, a second ledger implemented by a second blockchain for recording a second set of transactions associated with the application to continue to separate recordings of the application's transactions into the plurality of smaller blockchains for recording the application's transactions;

prohibiting, during and after a second state of the first ledger, recording the second set of transactions in the first ledger; and linking the first ledger and the second ledger.

19. The non-transitory computer-readable storage medium of claim 18, wherein the method further comprises deactivating use of the first ledger by the application, during the third state of the first ledger.

20. A system, comprising:

an application server, comprising a processor and a non-transitory computer-readable storage medium for tangibly storing thereon program logic for execution by the processor of the application server, the program logic of the application server comprising executable logic for distributing an application over the Internet; and a transactions server, comprising a processor and a non-transitory computer-readable storage medium for tangibly storing thereon program logic for execution by the processor of the transactions server, the program logic of the transactions server comprising:

executable logic for generating, at a blockchain node, a first ledger implemented by a first blockchain for recording a first set of transactions associated with the application so as to separate recordings of the application's transactions into a plurality of smaller blockchains, instead of using one larger blockchain, for recording the application's transactions;

executable logic for recording during a first state of the first ledger, in the first ledger, the first set of transactions;

executable logic for generating, at the blockchain node, a second ledger implemented by a second blockchain for recording a second set of transactions associated with the application to continue to separate recordings of the application's transactions into the plurality of smaller blockchains for recording the application's transactions;

executable logic for prohibiting, during and after a second state of the first ledger, recording the second set of transactions in the first ledger; and linking the first ledger and the second ledger.

* * * * *